(12) United States Patent
Kato et al.

(10) Patent No.: US 6,680,879 B2
(45) Date of Patent: Jan. 20, 2004

(54) METHOD FOR RECORDING STREAM OF INFORMATION DATA INTO A DIGITAL STORAGE MEDIUM

(75) Inventors: Tetsuya Kato, Sayama (JP); Masao Negishi, Iruma (JP)

(73) Assignee: Teac Corporation (JP)

( * ) Notice: Subject to any disclaimer, the term of this patent is extended or adjusted under 35 U.S.C. 154(b) by 239 days.

(21) Appl. No.: 09/934,512

(22) Filed: Aug. 22, 2001

(65) Prior Publication Data

US 2002/0027838 A1 Mar. 7, 2002

(30) Foreign Application Priority Data

Sep. 1, 2000 (JP) ......................................... 2000-266156

(51) Int. Cl.[7] ............................................. G11B 21/08
(52) U.S. Cl. .................................. 369/30.05; 369/30.19
(58) Field of Search .......................... 369/30.05, 30.19, 369/30.08, 30.04, 30.07, 30.09, 30.12, 30.11, 47.12, 47.13, 47.23, 83, 84; 386/52, 57; 360/13

(56) References Cited

U.S. PATENT DOCUMENTS

| 4,823,333 | A | * | 4/1989 | Satoh et al. .................. 369/84 |
| 5,311,492 | A | * | 5/1994 | Tabuchi et al. ............... 369/47 |
| 5,610,888 | A | * | 3/1997 | Hiranuma .................... 369/47 |
| 6,172,948 | B1 | * | 1/2001 | Keller et al. .................. 369/32 |
| 6,388,959 | B1 | * | 5/2002 | Kondo ....................... 369/30.19 |
| 6,421,499 | B1 | * | 7/2002 | Kim et al. .................... 386/95 |
| 6,442,108 | B1 | * | 8/2002 | Kurihara et al. ......... 369/30.05 |
| 6,542,445 | B2 | * | 4/2003 | Ijichi et al. ............... 369/30.08 |
| 6,556,518 | B2 | * | 4/2003 | Isobe et al. .............. 369/30.19 |
| 6,560,174 | B1 | * | 5/2003 | Takenaka ................. 369/47.12 |

FOREIGN PATENT DOCUMENTS

JP          04370577 A        12/1992

* cited by examiner

*Primary Examiner*—Tan Dinh
(74) *Attorney, Agent, or Firm*—Woodcock Washburn LLP

(57) ABSTRACT

A CD-R recorder capable of re-recording a series of musical tunes from a phonograph record to a CD-R, with addresses assigned to the respective tunes for ease of accessing later. Included is a random-access memory on which there are to be stored by the user a series of incremental addresses to be assigned to the successive tunes recorded, and the expected playing times of the tunes ascertained previously, as from the record jacket or by pre-recording of the tunes. The actual playing time of each tune being recorded is measured and compared with the expected playing time of that tune on the RAM. Upon agreement of the expected and the actual playing time of each tune, the addresses on the RAM are incremented to cause each tune to be recorded with an address assigned thereto according to its storage location on the disk.

12 Claims, 13 Drawing Sheets

| TRACK NO. | EXPECTED REC. TIMER | | |
|---|---|---|---|
| | MIN. | SEC. | FR. |
| 1 | 0 4 | 3 0 | 2 5 |
| 2 | 0 5 | 1 5 | 4 0 |
| 3 | 0 2 | 1 0 | 0 8 |
| 4 | 0 5 | 2 5 | 3 5 |

| INFORMATION STREAMS | ADDRESSES | | EXPECTED REC. TIMER | | |
|---|---|---|---|---|---|
| | TRACK NO. | INDEX NO. | MIN. | SEC. | FR. |
| 1 | 1 | 1 | 01 | 50 | 20 |
| 2 | 1 | 2 | 01 | 05 | 00 |
| 3 | 1 | 3 | 01 | 20 | 10 |
| 4 | 1 | 4 | 00 | 50 | 10 |
| 5 | 1 | 5 | 00 | 40 | 20 |
| 6 | 1 | 6 | 01 | 10 | 30 |
| 7 | 1 | 7 | 02 | 10 | 20 |
| .. | .. | .. | .. | .. | .. |
| 99 | 1 | 99 | 00 | 50 | 20 |
| 100 | 2 | 1 | 00 | 40 | 10 |
| 101 | 2 | 2 | 00 | 30 | 30 |

61a

METHOD FOR RECORDING STREAM OF INFORMATION DATA INTO A DIGITAL STORAGE MEDIUM

BACKGROUND OF THE INVENTION

This invention relates to a system for recording streams of information, themselves supplied without accompanying self-identificatory data or addresses, on a desired record medium along with addresses assigned thereto according to their storage locations on the medium. The recording system according to the invention is particularly well suited for the recording by the end user of a series of musical tunes, which may be supplied in the form of an analog signal from a source such as a phonograph record or magnetic tape, at addressable locations on a digital storage medium such as an optical disk as typified by a CD-R, recordable compact disk, although no unnecessary limitations to this particular application are intended.

User recording of music or other matter on CD-Rs or like digital record media is itself not new, as disclosed for example in Japanese Unexamined Patent Publication No. 4-370577. One of the problems encountered in user recording of music on CD-Rs has been how to make the recorded tunes individually addressable. Of course, when the music to be recorded comes from digital sources such as CDs, complete with addresses such as track numbers or tune numbers, the music is recordable with the original addresses.

The problem occurred in recording music from analog sources such as phonograph records or magnetic tapes. In these cases the user had to insert track numbers between the successive recordings, incrementing the track numbers at the pauses by audibly monitoring the recordings and/or by observing the visual indications of the recordings. The whole DC-R was ruined, wasted, and the complete program had to be re-recorded on another disk, if he or she failed to correctly detect the pauses for address insertion.

SUMMARY OF THE INVENTION

The present invention is designed to make it easier than heretofore for the user to re-record a series of musical tunes or other streams of information from their source such as a phonograph record or magnetic tape to a record medium as typified by the CD-R, along with addresses assigned thereto according to their storage locations, or tracks, on the record medium.

Another object of the invention is to make use of the playing times, ascertained previously, of the musical tunes in addressably re-recording them on the CD-R or the like, the playing times being usually printed on phonograph record jackets, leaflets, or the like.

Another object of the invention is to provide for cases where the user has to record tunes or other information streams whose playing times are not knowable, enabling him or her to accurately determine and input the playing times of the tunes or the like into the memory.

A further object of the invention is to make as many as, say, ninety-nine, or even more, different tunes or information streams individually addressable on a single record medium on which they have been re-recorded.

Briefly, the present invention may be summarized as a recording apparatus capable of recording a series of musical tunes or like information streams, supplied from an external source without self-identificatory data, on a record medium together with addresses assigned one to each information stream according to a storage location thereof on the record medium. Included is a memory for storing a series of incremental addresses to be assigned to successive information streams as the latter are recorded, and expected lengths in time of the information streams. During recording, the actual length in time of each information stream is measured by a timer. Connected to both the memory and the timer, a processor compares the expected and the actual length in time of each information stream that has been recorded, and increments the addresses stored on the memory upon agreement of the expected and the actual length in time of each information stream, thereby causing each information stream to be recorded on the record medium together with an address assigned thereto.

Thus the invention has succeeded in automating the insertion of addresses between the information streams being recorded. No errors, and no ruining and wasting of record media, is to occur as long as the expected lengths in time of the information streams to be recorded are correctly input to the memory.

The "lengths in time of information streams" in the foregoing summary is a generic term for the playing times of musical tunes in particular. In cases where the user knows the playing times, as from the phonograph record jacket or leaflet, he or she may input them into the memory according to visual instructions and immediately proceed to the re-recording of the tunes on the CD-R or the like. If the user does not know the playing time, then he or she has to measure them by playing the record or tape. The user is, however, saved from this trouble of measuring the playing times of the tunes in some additional embodiments of the invention, in which means are provided for helping the user determine and input the playing times of the tunes preliminary to their re-recording on the CD-R or the like.

In all the preferred embodiments to be disclosed, the invention uses the track numbers of the recorded tunes as their addresses. Up to ninety-nine tunes are therefore recordable and individually addressable in the case of the standard CD-R. However, in consideration of cases where greater numbers of information streams, such as items or pieces of sound effects, are to be recorded, an embodiment is disclosed in which each of the ninety-nine track numbers is combined with each of as many index numbers to serve as an address for one information stream, so that far greater numbers of information streams are recordable at addressable locations on one CD-R.

The above and other objects, features and advantages of this invention and the manner of realizing them will become more apparent, and the invention itself will best be understood, from a study of the following description and appended claims, with reference had to the attached drawings showing the preferred embodiments of the invention.

BRIEF DESCRIPTION OF THE DRAWINGS

FIG. 14 is a table similar to FIG. 4 but listing a different set of addresses to be assigned to the successive information streams recorded and their expected recording times, which are both stored on a second RAM table of the FIG. 13 embodiment.

DESCRIPTION OF THE PREFERRED EMBODIMENTS

The present invention will now be described more specifically as adapted for the re-recording of musical tunes from a phonograph record to a CD-R. The record/playback system of FIG. 1 comprises a compatible CD-R/RW record/playback device 1 for use with both CD-Rs and CD-RWs, and a remote control 2 for the record/playback device. A phonograph record player 3 of conventional make is shown connected to the record/playback device 1 for the purpose of re-recording only, the record player being replaceable by any other suitable source of an analog audio signal to be re-recorded on a CD-R. The record/playback device 1 will be hereinafter referred to as the CD-R recorder or simply as the recorder according to common parlance, even though it is equipped for playing CD-Rs, and recording and playing CD-RWs, as well.

Figure 1:
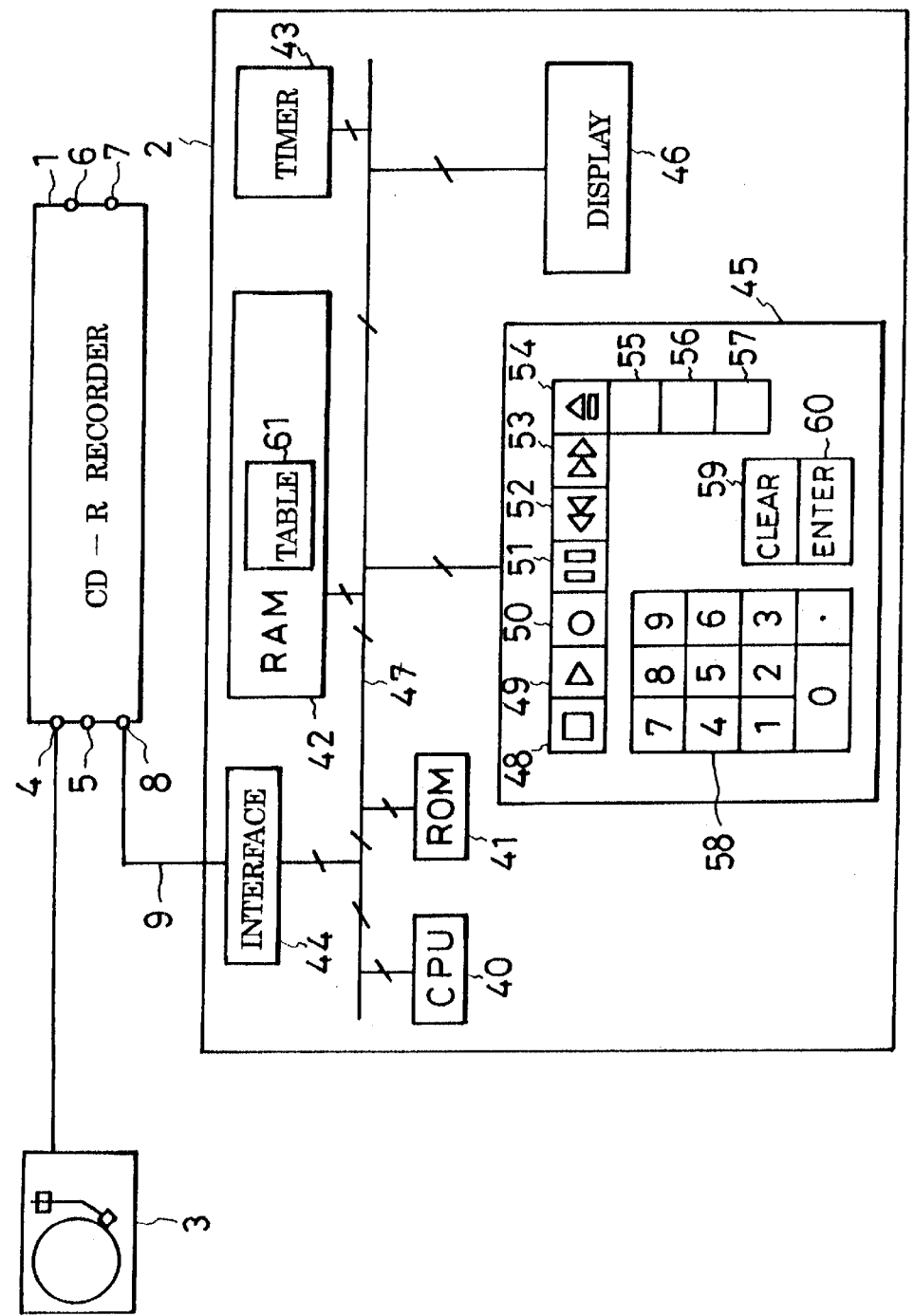
FIG. 1 is a block diagram of the record/playback system embodying the novel concepts of this invention, the record/playback system comprising a CD-R/RW record/playback device and a remote control therefor.

Insofar as shown in FIG. 1, the CD-R recorder 1 comprises an analog input terminal 4 now shown connected to the record player 3 for inputting an analog audio signal to be recorded, a digital input terminal 5 for inputting a digital audio signal to be recorded, an analog output terminal 6 for putting out an analog equivalent of the digital signal recovered from the CD played on the recorder 1, a digital output terminal 7 for putting out the digital signal without conversion into an analog signal, and a remote control terminal 8 shown connected to the remote control 2 by way of a cable 9. The CD-R recorder 1 is equipped to record the analog, or digital if desired, input signal in real time on a CD-R along with various subcode including, according to the novel concepts of this invention, the track numbers assigned to the tunes being recorded depending upon their tracks or storage locations on the CD-R.

Figure 2:
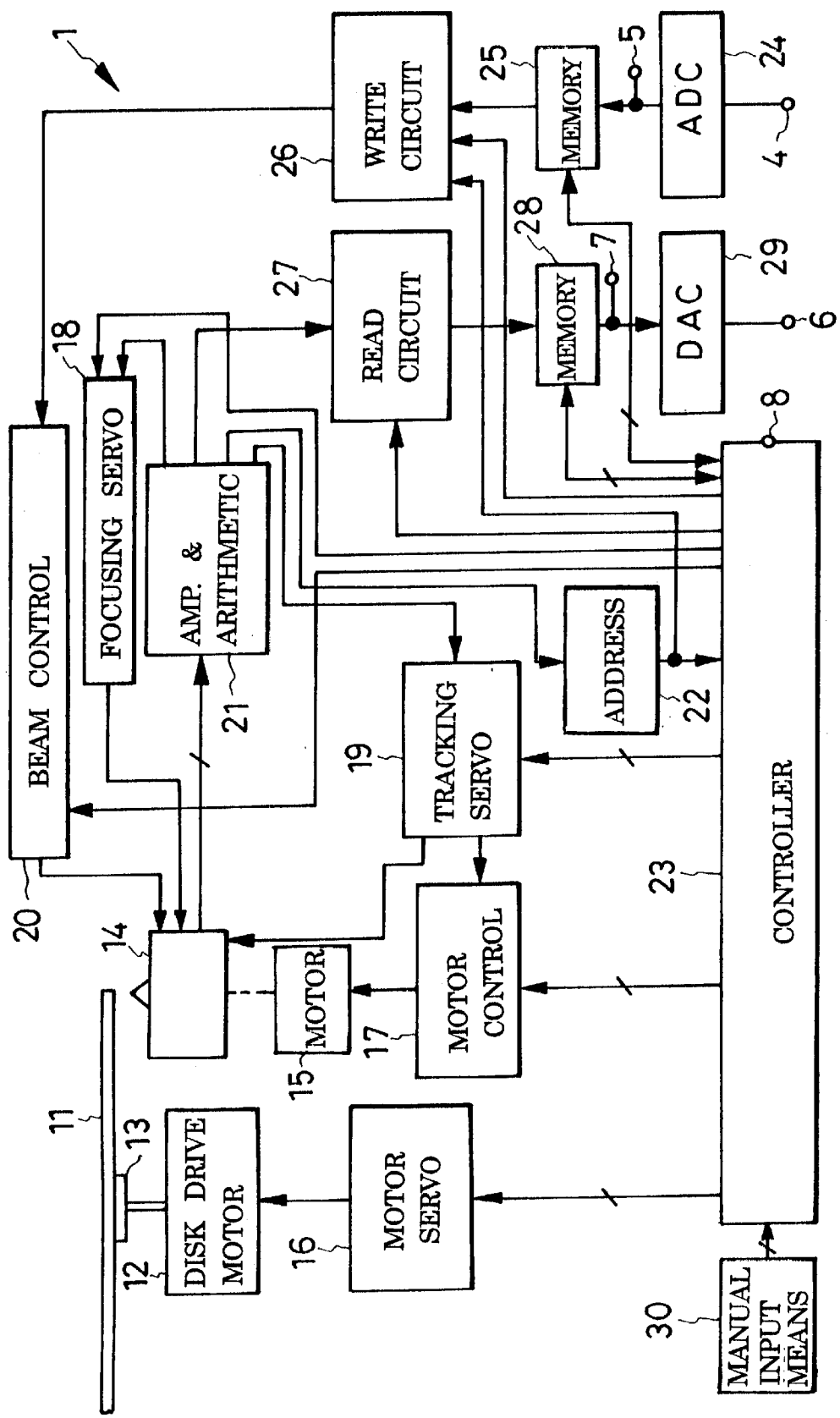
FIG. 2 is a block diagram showing the CD-R/RW record/playback device of FIG. 1 in more detail.

As illustrated in more detail in FIG. 2, the CD-R recorder 1 is for use with a replaceable CD-R 11, which is to be driven by an electric disk drive motor 12 via a turntable 13. It is understood that the CD-R 11 is of standard make having a pregroove preformed in one surface thereof in a multiturn spiral pattern as a tracking guide for the beam. Also as is well known in the art, the pregroove wobbles at frequencies that defy tracking by the beam. The wobbles represent addresses, among other information that is essential for proper functioning and control of the CD-R. Guided by the pregroove, the beam of write intensity intermittently irradiates the surface of the CD-R 11 to create a spiral of bumps or pits impressed into the disk surface. Further, during such recording, the beam of write intensity alternates with that of read intensity, which reads the tracking and address information from the wobbling pregroove.

The disk drive motor 12 drives the CD-R 11 at the standard consumer audio CD speed, in addition to higher speeds. The speed control of the disk drive motor 12 is made by a motor speed servo circuit 16.

Figure 3:
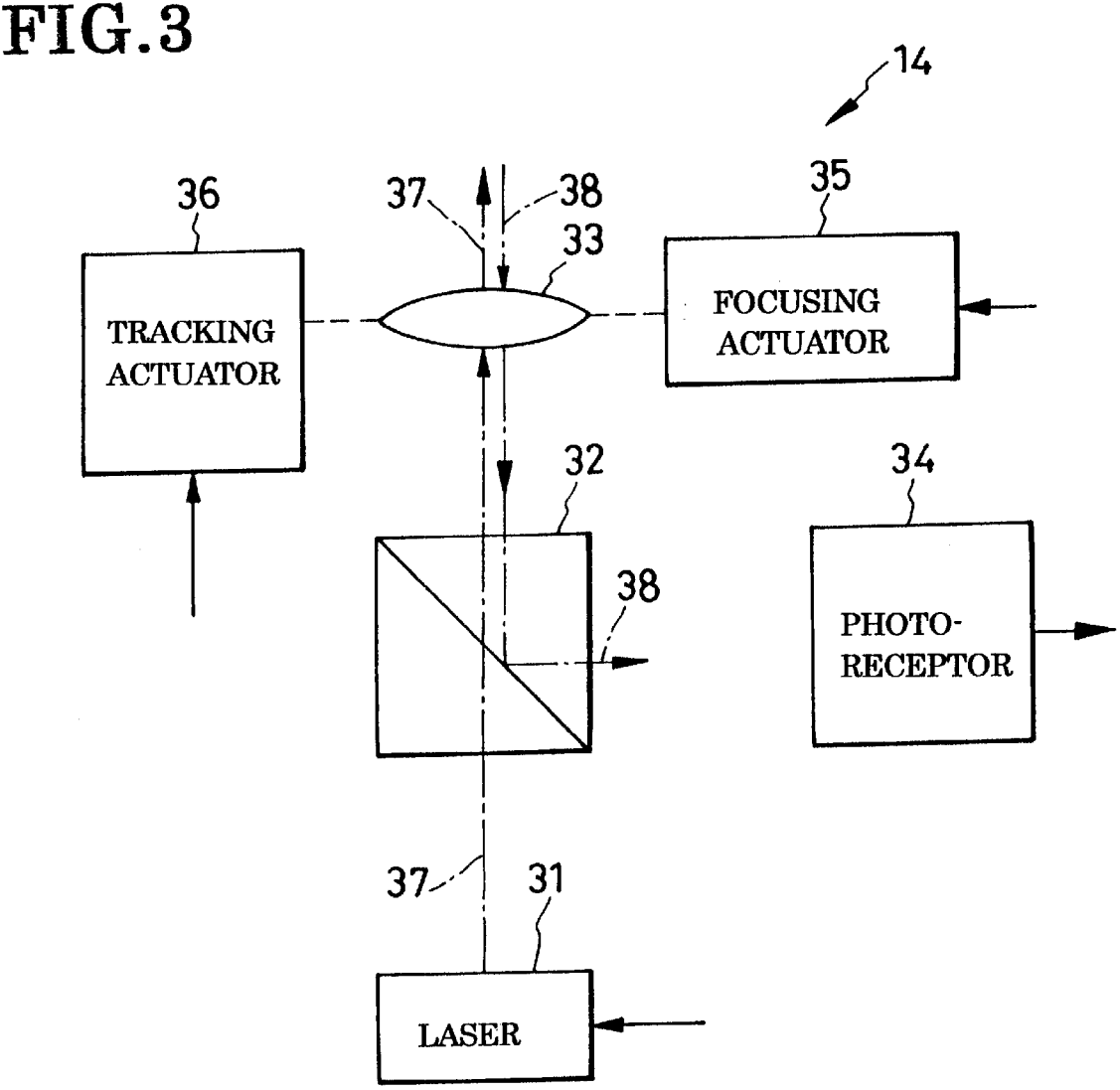
FIG. 3 is a block diagram of the optical pickup included in the FIG. 2 record/playback device.

Reference may be briefly had to FIG. 3 for a discussion of an optical pickup or photoelectric transducer 14 disposed opposite the recording surface of the CD-R 11. The transducer 14 has a light source shown as a laser 31, which emits a beam 37 for irradiating the disk surface via a beam splitter 32 and an objective lens 33. The reflection 38 of the laser beam 37 from the disk surface travels back through the objective 33 into the beam splitter 32 and is redirected by the latter into a photoreceptor 34 conventionally comprising a set of photodiodes, not shown, thereby to be translated into electric signals. The laser beam is switched as aforesaid between write intensity and read intensity, under the control of a beam control circuit shown at 20 in FIG. 2.

With reference back to FIG. 2 the transducer 14 is fed across the pregroove turns of the CD-R 11 by a directional electric positioning motor 15 via a motion translating mechanism, not shown, of any known or suitable design capable of converting the bidirectional motor rotation into the linear back-and-forth travel of the transducer. The positioning motor 15 is itself driven under the direction of a motor control circuit 17. Having inputs connected to a tracking servo circuit 19 and a system controller 23, the motor control circuit 17 controllably drives the positioning motor 15 in response to the tracking control signal and the seek data received therefrom.

The unshown photodiodes constituting the photoreceptor 34, FIG. 2, of the transducer 14 are connected to an amplifier and arithmetic circuit 21 of known construction comprising amplifiers, adders, and subtracters, all not shown. Inputting the photoreceptor outputs, the amplifier and arithmetic circuit 21 amplifies and further processes them into a read signal, representative of the music or other matter recovered from the disk 11, as well as into a focusing control signal and a tracking control signal. The read signal is directed into a read circuit 27, another known component comprising a binary wave-shaping circuit, a phase-locked loop circuit, an eight-to-fourteen-modulation decoder, an error detection and correction circuit, etc., all not shown. The read circuit 27 processes the input read signal into read data in the form of well-defined pulses, preparatory delivery to a buffer memory 28.

The noted focusing control signal from the amplifier and arithmetic circuit 21 is directed into a focusing servo circuit 18, which then responds by producing a drive signal for a moving-coil focusing actuator 35, FIG. 3, which is included in the transducer or pickup assembly 14. Coupled to the objective 33, the focusing actuator 35 moves the objective toward and away from the disk 11 in order to keep the beam focused thereon. The system controller 23 is connected to the focusing servo circuit 18 both for on-off control of the focusing servo and the switching of phase compensation characteristics.

Inputting the tracking control signal from the amplifier and arithmetic circuit 21, a tracking servo circuit 19 puts out a drive signal for a moving-coil tracking actuator 36, FIG. 3, included in the pickup assembly 14. The tracking actuator 36 moves the objective 33 parallel to the disk surface in order to keep the laser beam on the track. The system controller 23 is also connected to the tracking servo circuit 19 for on-off control of the tracking servo, the switching of phase compensation characteristics, and the so-called jumping of the laser beam. The jumping is such that, in response to pumping pulses from the system controller 23, the tracking servo circuit 19 causes the tracking actuator 36 to move the objective 33 radially of the disk 11, positioning the laser beam 37 in a desired track position on the disk. In this sense the tracking servo circuit 19 an tracking actuator 39 constitute beam-positioning means in addition to the positioning motor 15 and motor control circuit 17.

An address retrieval circuit 22 has an input connected to the amplifier and arithmetic circuit 21 for detecting the track addresses by demodulating the pregroove wobble component of the read signal obtained from the circuit 21 during recording and, during playback, by demodulating the subcode recovered from the disk 11. The track addresses thus recovered are sent to the system controller 23 and, during recording, to the write circuit 26 as well. The addresses under consideration here are different from the addresses of the musical tunes or like information streams to be dealt with by the instant invention.

As has been set forth in connection with FIG. 1, the CD-R recorder 1 has the analog input 4 which is therein shown connected to the record player 3. In the recorder 1 this analog input 4 is connected to an analog-to-digital converter (ADC) 24 and thence to a buffer memory 25. Inputting from the ADC 24 the digital equivalent of the input analog signal to be recorded, the buffer memory 25 temporarily stores it and puts it out in time-compressed format, for delivery to the write circuit 26.

The write circuit 26 is itself of familiar design comprising an encoder for eight-to-fourteen modulation of the digital audio signal, an error correction dada insertion circuit, and a circuit for insertion, as subcode, of the address data from the address retrieval circuit 22. Further, according to the novel concepts of this invention, the address insertion circuit inserts the tune numbers or track numbers of the musical tunes recorded by the user. The modulated audio signal as well as the subcode is translated by the write circuit 26 into write pulses suitable for delivery to the beam control circuit 20.

The beam control circuit 20 responds to the incoming write pulses by delivering to the laser 31, FIG. 3, of the transducer 14 a signal for on-of and intensity control of the beam 37. During playback the beam control circuit 20 causes the laser 31 to generate a beam of read intensity under the direction of the system controller 23.

Connected to the output of the read circuit 27, the buffer memory 28 is intended for time-expansion of the read data. The resulting output from the buffer memory 28 is fed into a digital-to-analog converter (DAC) 29 thereby to be reconverted into an analog signal for delivery to the analog output 6. A headphone or loudspeaker system, not shown is to be connected to this analog output 6.

The system controller 23 may take the form of a microcomputer or microprocessor with a built-in central processor unit (CPU), a read-only memory (ROM), and a random-access memory (RAM). It is understood that the system controller 23 is preprogrammed for switching between record and playback modes, beam on-off and intensity control, beam positioning control, disk drive motor control, and focusing servo control. Connected to the system controller 23, manual input means 30 are similar to the FIG. 1 remote control 2, which is to be detailed subsequently, in conventionally having pushbutton or key switches for recording, playback, stop, pause, fast forward, reverse, track (tune) forward, track backward, and track number selection.

Referring to FIG. 1 again, the remote control 2 is shown connected by way of a line 9 to the connector 8 of the CD-R recorder 1, or to its system controller 23 as in FIG. 2, although wireless interfacing is of course possible, as by infrared rays or radio waves. The remote control 2 comprises a CPU 40, ROM 41, RAM 42, timer 43, serial interface 44, manual input means 45, liquid-crystal display 46 and bus 47. For inputting various commands into the recorder 1, the input means 45 have a "record" button 48, "play" button 49, "stop" button 50, "pause" button 51, "reverse" button 52, "fast forward" button 53, "track (tune) forward" button 54, "track backward" button 55, "track number" button 56, "eject" button 57, set of digit keys 58, "clear" key 59, and "enter" key 60. All the buttons and keys 48–60 are understood to constitute means for actuation of switches, not shown, associated therewith.

Figures 4, 5:
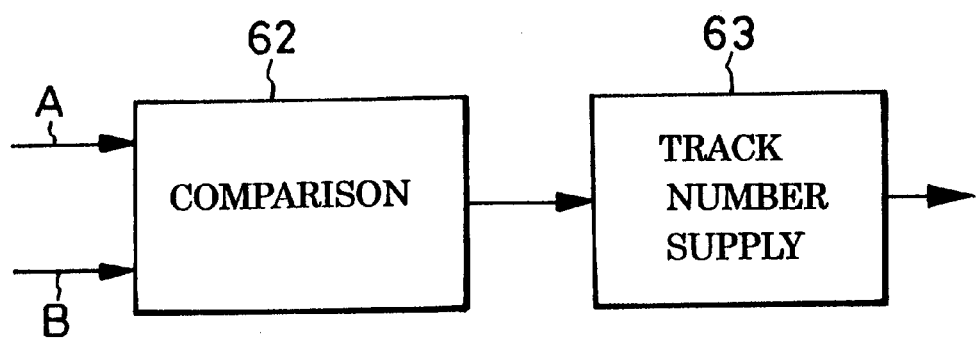
FIG. 4 is a table listing by way of example the addresses to be assigned to the successive information streams recorded and their expected recording times, which are both stored on the RAM table in the remote control of the FIG. 1 system.
FIG. 5 is a block diagram of means included in the CPU of the FIG. 1 remote control for assigning addresses to the successive information streams recorded.

The RAM 42 has a memory table 61 on which there are stored, as tabulated in FIG. 4 for the purpose of illustration only, both track or tune numbers, which are to be assigned as addresses to the successive tunes fed from record player 3 to CD-R recorder 1, and the expected recording time of each tune. For example, the first tune to be recorded (Track No. 1) is expected, or previously ascertained, to be four minutes, thirty seconds, twenty-five frames long, the second tune (Track No. 2) to be five minutes, fifteen seconds, forty frames long, and so forth. The music played on the record player 3 is recorded substantially in real time on the CD-R 11 in this embodiment of the invention, so that the time required for recording on the disk 11 is equal to the time for playback on the record player and from the disk.

As indicated equivalently in FIG. 5, the CPU 40 of the remote control 2 comprises comparison means 62 and track number supply means 63. The comparison means 62 has one input connected to the RAM 42, and another to the timer 43. Comparing the expected recording time A, on the RAM table 61, of the tune to be recorded on each track and the actual recording time B, as measured by the timer 43, of the tune being recorded on that track, the comparison means 62 puts out a signal indicative of agreement or disagreement of A and B. Each time the actual and the expected recording time agree, the track number supply means 63 increment the track numbers, supplying the next track number to the CD-R recorder 1 in order to be recorded on the CD-R together with the next tune to be recorded.

The CD-R 11 can be of standard format, recording data frame by frame. As indicated diagrammatically at (A) in FIG. 6, each frame is constituted of a sync region 64, a subcode region 65, and a data and parity region 66. The track or tune numbers according to the invention are recorded on the subcode region 65.

Figure 6:
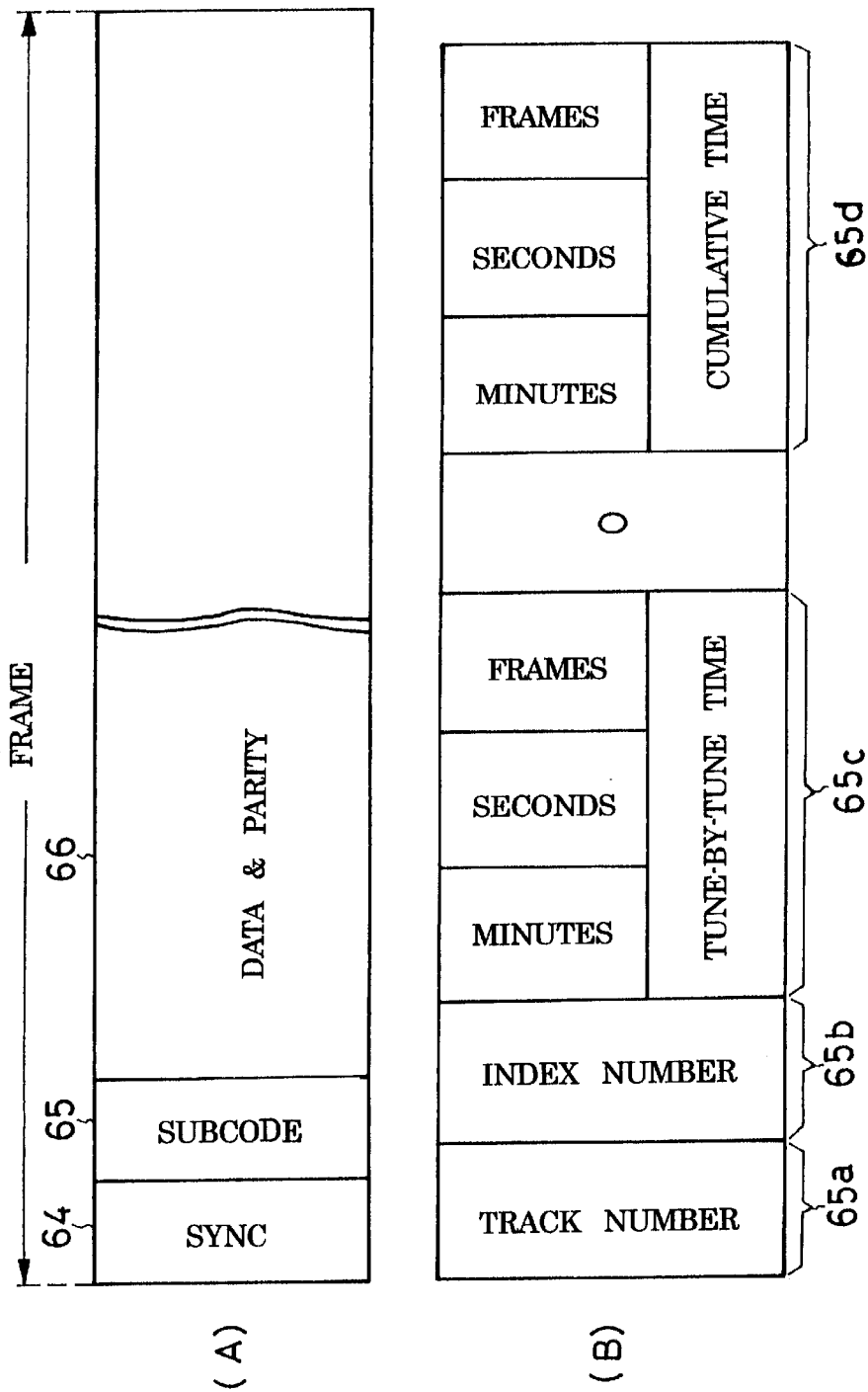
FIG. 6, consisting of (A) and (B), is a diagram explanatory of the makeup of each frame of a standard CD-R.

As shown in more detail at (B) in FIG. 6, the subcode region 65 of both CDs and CD-Rs is subdivided into a track number subregion 65a, index number subregion 65b, tuneby-tune time subregion 65c, cumulative time subregion 65d, in addition to other subregions which are not shown because of their lack of pertinence to the instant invention. The track numbers that can be recorded on all the subregions 65a of the CD-R are limited to ninety-nine according to the current CD format. There are therefore ninety-nine different addresses available for musical tunes or other information streams to be recorded on each CD-R according to the invention, so that up to as many different tunes or information streams may be recorded at individually addressable locations on the disk. The index numbers on the subregions 65b may be used where applicable to represent the movements of each tune.

Operation

In re-recording several tunes from a long-play phonograph record to the CD-R 11, the playing times of the recorded tunes may most likely be printed on the record jacket or on the leaflet inserted therein. In that case, prior to recording, the user may input the tune or track numbers of the tunes to be recorded and their playing times on the table 61 of the RAM 42 of the remote control 2 by means of the digit keys 58, "clear" key 59, and "enter" key 60. The display 46 will visually indicate the matter being so written on the RAM table 61. Preferably, the ROM 41 should be factory-preprogrammed for visual indication of the procedure by which the recording information above is to be written on the RAM table 61 by the user. The procedure is to be exhibited on the display 46 when the user indicates on the input means 45 that he or she is going to input the recording information.

Unfortunately, there may be no playing time data available for some phonograph records. In that case, preparatory to re-recording, the user may play the tunes and measure their playing times. Then he or she can write the measured times on the RAM table 61 through the same procedure as above.

Recording may be started following the connection of the remote control 2 and record player 3 to the CD-R recorder 1 and the writing of the recording data on the RAM table 61. The first step is to manipulate the input means 45 of the remote control 2 for setting up the sequential recording program based upon the recording data tabulated as in FIG. 4. As flowcharted in FIG. 7, the sequential recording program will start automatically at $S_o$. The user may actuate the "record" button 48 on the remote control 2, perhaps immediately after setting the record player 3 into operation. The answer "yes" to the node $S_1$ of the FIG. 7 program leads it to the block $S_2$ which dictates the reading of the RAM table 61 listing the expected recording times (equivalent to the playing times ascertained as above) of all the tunes to be recorded at the successive tracks on the disk. The reading of the RAM table 61 following the actuation of the "record" button 48 will start from the expected recording time for the first tune, proceeding to that for the second tune, then to that for the third tune, and so forth, each time the "record" button is actuated at the block $S_1$.

Then comes anode node $S_3$ which asks if all the expected recording time data on the RAM table 61 have been read out. The recording session will come to an end at $S_4$ if all the tabulated data have been read out. The answer to the node $S_3$ is now "no," so that the timer 43, FIG. 1, of the remote control 2 is reset into operation, and the track or tune number of the tune to be recorded at that time is fed into the CD-R recorder 1, according to the next block $S_5$.

The analog signal of the first tune being played on the record player 3 will come into the CD-R recorder 1 through its analog input 4 with the actuation of the "record" button 48. Digitized by the ADC 24, FIG. 2, the input audio signal will be directed into the memory 25 and thence into the write circuit 26. The track number data from the remote control 2 will travel through the interface 44 and cable 9 and enter the recorder 1 through the remote control input 8 of the system controller 23, from which the data will be directed into the write circuit 26. This circuit 26 will operate to form the write signal of standard format such that the track number is placed on the subcode region 65 of each frame, and the music data on the data and parity region 66. Inputting this write signal, the beam control circuit 20 will modulate the laser beam 37 accordingly. The first tune together with its track number, one, will be thus recorded on the CD-R 11.

Figure 7:
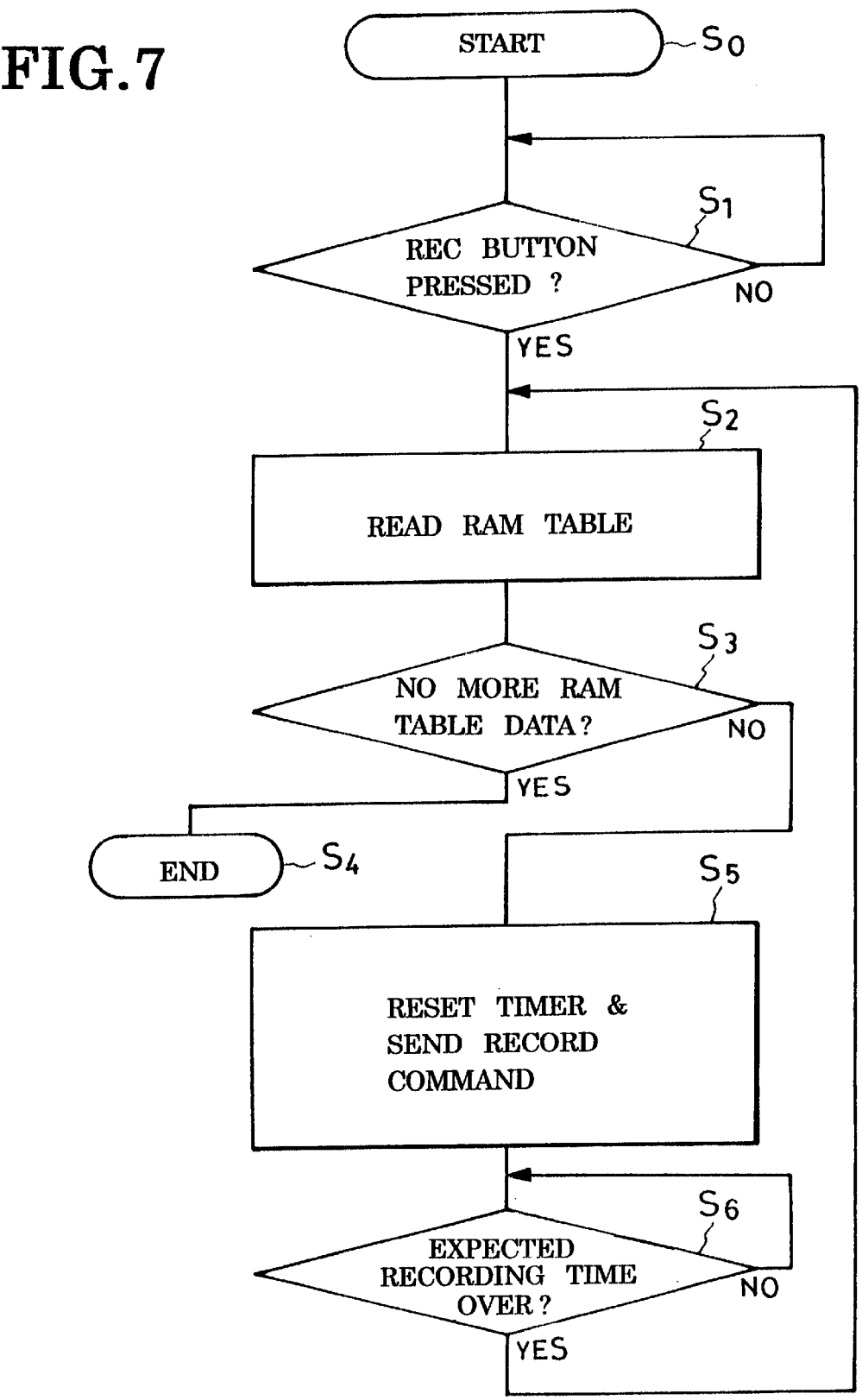
FIG. 7 is a flowchart of a sequential recording program introduced into the FIG. 1 remote control for controlling the sequential recording of a series of musical tunes or the like, with an address assigned automatically to each.

During such recording of the first tune, the CPU 40, FIG. 1, of the remote control 2 will constantly check to see if the expected recording time of the tune now being recorded has been reached, according to still another node $S_6$ of the FIG. 7 program. The CPU 40 will compare the time being measured by the timer 43 and the expected recording time of, say, four minutes, thirty seconds, twenty-five frames for the first tune.

The program returns to the block $S_2$ when the actual recording time of the first tune agrees with the expected time. Then the expected recording time for the second tune will be read out from the RAM table 61. Further, according to the block $S_5$, the timer 43 will again be initialized, and the track number, two, of the next tune will be sent to the CD-R recorder 1. The second tune with its track number will be recorded on the CD-R 11. The steps $S_2$, $S_3$, $S_5$ and $S_6$ of the FIG. 7 program will be repeated until there is no more data left on the RAM table 61, whereupon the program will end at $S_4$.

It is thus seen that a series of musical tunes being played on the record player 3 or the like are automatically re-recorded on the CD-R 11 along with the track numbers assigned to the respective tunes, only if the lengths in time of these tunes are known. Since the track numbers serve as the addresses if the locations where the tunes are stored, the user may later readily access to any of the recorded tunes merely by specifying their track numbers.

Second Form

Not all phonograph record jackets or leaflets indicate the playing times of the tunes recorded. In such cases the user must ascertain the playing times of all the tunes to be re-recorded on a CD-R one way or another. This second embodiment of the invention is devised to help the user accurately determine the playing times.

Figure 8:
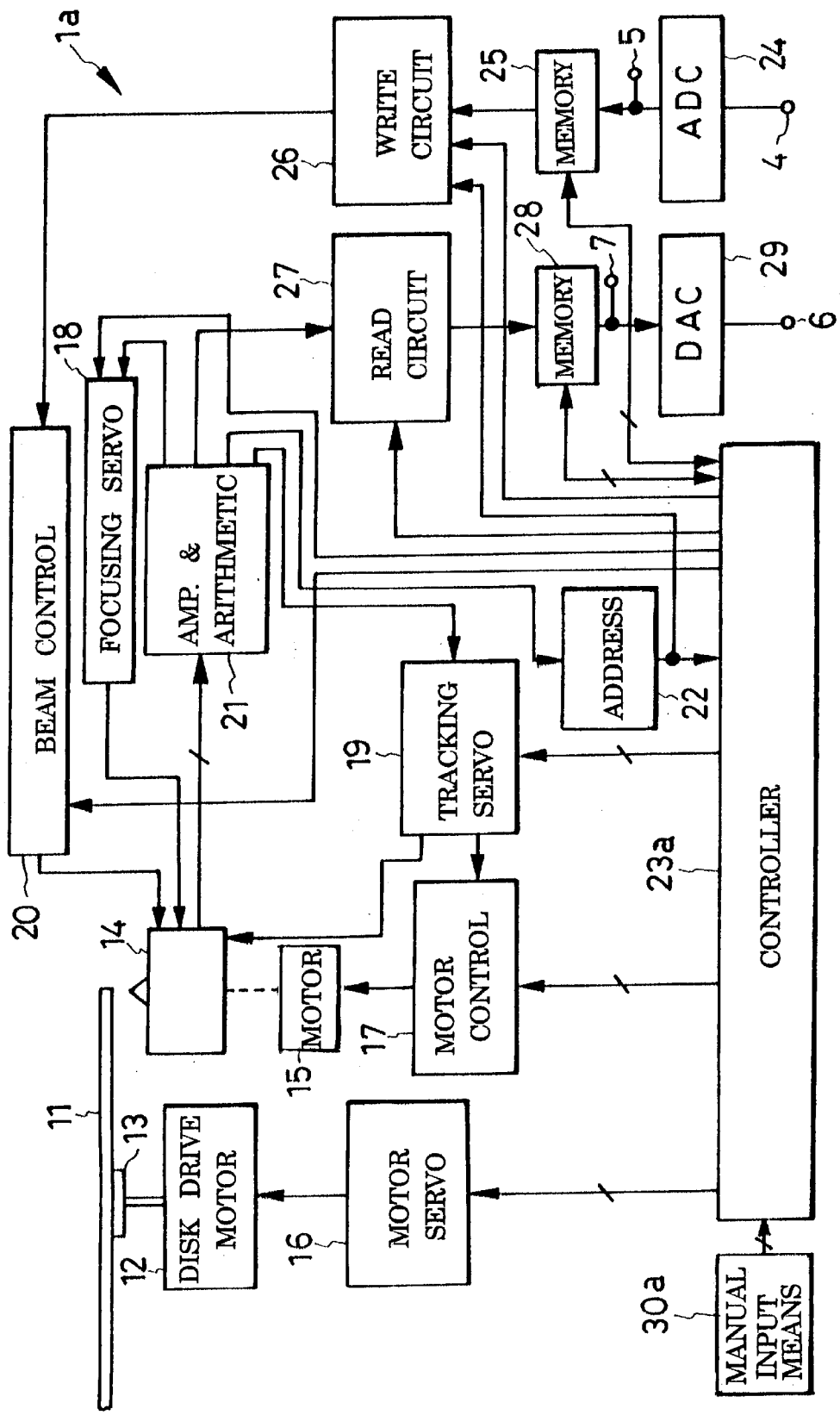
FIG. 8 is a diagram similar to FIG. 2 but showing an alternative form of CD-R/RW record/playback device according to the present invention.

The modified CD-R recorder 1a of FIG. 8 is self-contained, so to say, to record a series of musical tunes or the like along with their track numbers according to the invention, rather than relying on a remote control as in the previous embodiment. The recorder 1a incorporates a system controller 23a, together with manual input means 30a, of FIG. 9 construction in order to perform its additional function. Except for this system controller 23a, the recorder 1a is of conventional make, as is the FIG. 2 recorder 1 itself, so that the foregoing description of FIG. 2 largely applies thereto.

Figure 9:
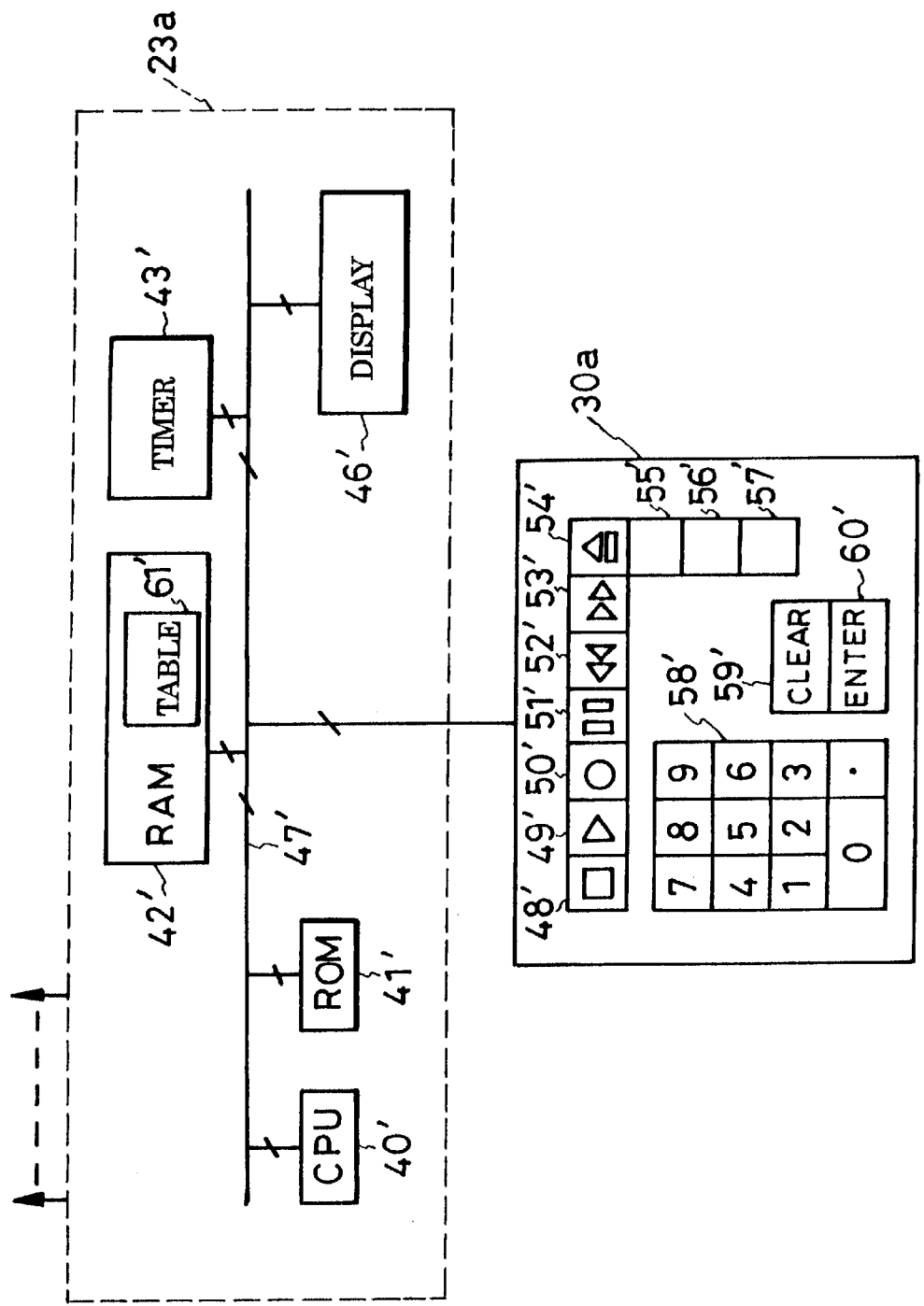
FIG. 9 is a block diagram showing the system controller and manual input means of the FIG. 8 device in more detail.

With reference to FIG. 9 the modified system controller 23a comprises a CPU 40', ROM 41', RAM 42', timer 43', and liquid-crystal display 46'. Functionally, the system controller 23a combines the FIG. 1 remote control 2 and FIG. 2 controller 23. The CPU 40', ROM 41' and RAM 42' of the FIG. 9 controller 23a should therefore be understood to possess not only the functions of the CPU 40, ROM 41 and RAM 42 of the FIG. 1 remote control 2 but those of the microcomputer of the FIG. 2 controller 23 as well. Of course, the system controller 23a may comprise both a microcomputer functionally equivalent to the FIG. 2 controller 23, and another microcomputer functionally equivalent to the FIG. 1 remote control 2.

As pictured also in FIG. 9, the manual input means 30a connected to the system controller 23a have the same buttons and keys as the manual input means 45, FIG. 1, of the remote control 2 of the first disclosed CD-R recorder. Such buttons and keys are therefore identified in FIG. 9 by priming the reference numerals used to denote their FIG. 1 counterparts. Various known modifications of the manual input means are possible, including keys or buttons that respond differently to different manners of actuation, and additional manual control means such as an analog input attenuator and a jog dial for advancing or reversing the process of playback.

It is understood that the ROM 41' of the system controller 23a is factory preprogrammed for writing on the RAM table 61' the expected playing times of the tunes to be recorded, as in FIG. 4, and for assigning the track numbers to the successive tunes recorded, as in FIG. 7. All the procedures necessary for recording and playing of CD-Rs or CD-RWs are of course also preprogrammed on the ROM 41'.

Operation of Second Form

A phonograph record player or the like from which music is to be re-recorded on a CD-R may be connected to the analog input 4 of the FIG. 8 CD-R recorder 1a. Instead of a CD-R, on which the music is to be re-recorded with track numbers, a commercial CD-RW may first be placed upon the table 13 of the CD-R recorder 1a, the latter being conventionally fully compatible with both CD-Rs and CD-RWs. The user may re-record, or pre-record rather, the whole contents of the phonograph record or the like on the CD-RW. As is standardized with CD-R/RW recorders in general, the lapse of time from the start of re-recording will be cumulatively recorded on the subcode regions 65, FIG. 6, of the CD-RW with the progress of the pre-recording.

Then the manual input means 30a of the recorder 1a may be actuated to send to the CPU 40' of the system controller 23a a command for writing the playing times of the pre-recorded tunes on the table 61' of the RAM 42' as the expected recording times of these tunes to be subsequently and finally recorded on a CD-R. This command will invoke the playing time tabulation program, or expected recording time tabulation program, flowcharted in FIG. 10. The user may proceed to actuate the "play" button 49' to start playing the CD-RW, it being understood that a headphone or a loudspeaker system is now connected to the analog output 6. Listening to the music being played, the user may actuate the "enter" key at each pause between the tunes, thereby informing the CPU 40' of the end of playing of one tune.

Figure 10:
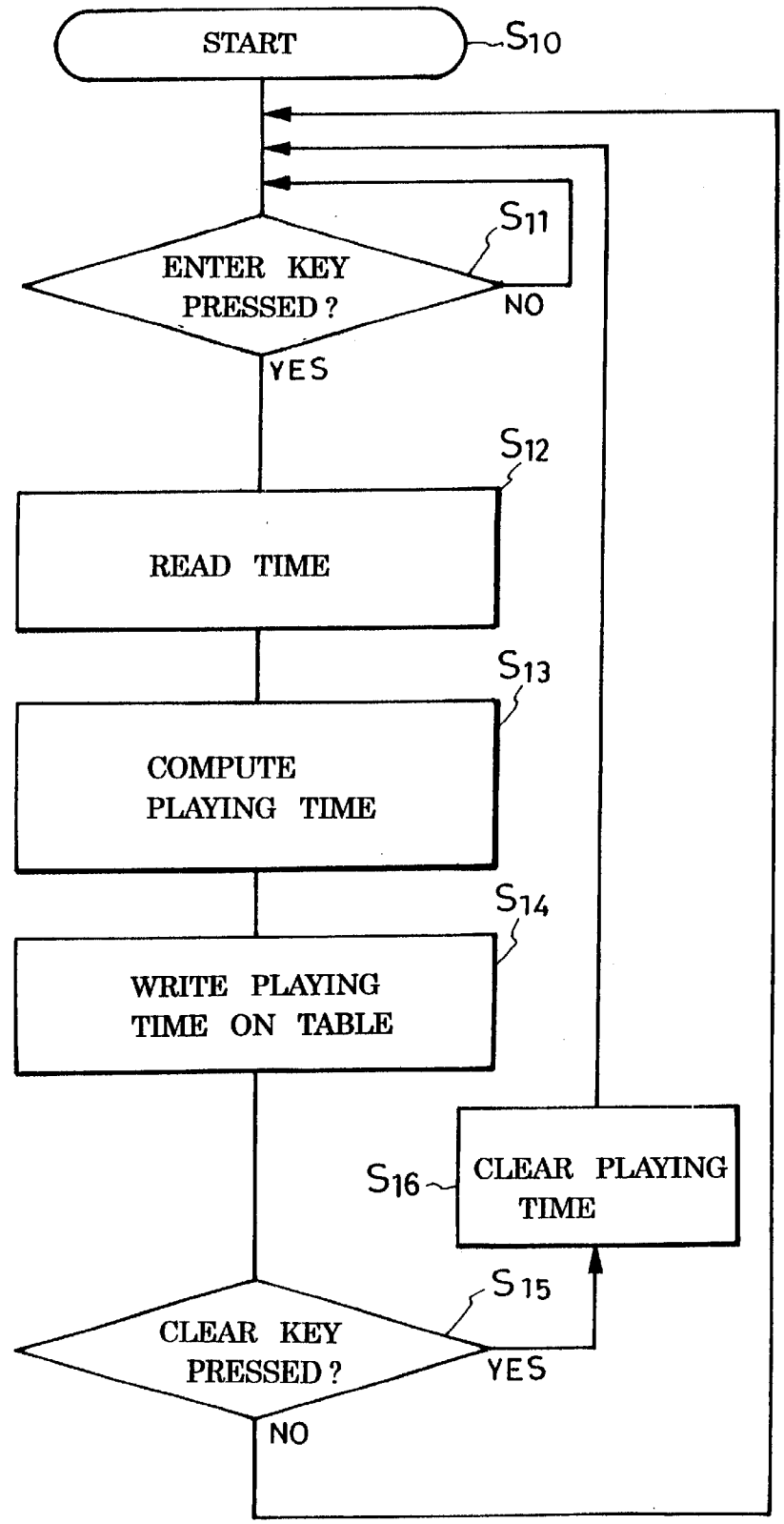
FIG. 10 is a flowchart of an expected recording time tabulation program introduced into the FIG. 9 system controller for tabulating the playing times, or expected recording times, of the tunes pre-recorded on a CD-RW before being finally re-recorded on a CD-R.

Triggered off at $S_{10}$ as above, the FIG. 10 playing time tabulation program asks at a node $S_{11}$ if the "enter" key 60' is actuated. If it is, the lapse of time from the start of pre-recording is read from the subcode of the read data at the moment of the "enter" key actuation according to a block $S_{12}$. Then, at the next block $S_{13}$, the playing time of each tune is computed on the basis of the recovered lapse of time. For example, the playing time of the first tune is equal to the cumulative time from the start of the pre-recording session; the playing time of the second tune is equal to the cumulative time from the start of the pre-recording session minus the playing time of the first tune; and so forth.

Then, at the next block $S_{14}$, the playing time of the tune computed at the preceding block is written on the table 61' of the RAM 42', as has been set forth in connection with FIG. 4. The playing times of the tunes pre-recorded on the CD-RW are needed as aforesaid as the expected recording times of the tunes in finally re-recording them on a CD-R.

Then comes the node $S_{15}$ which asks if the "clear" key 59' has been actuated. This node anticipates the likelihood that the user may have depressed the "enter" key 60' at a wrong moment in time. He or she is then advised to press the "clear" key 59' to return the program to the block $S_{16}$ whereby the playing time or times previously written on the RAM table 61' are cleared. The user may then proceed to detect the required pause, either by continue playing the CD-RW, by reversely playing it, or by forwardly playing it after some reversal, and to reactuate the "enter" key 60' at the pause. The blocks $S_{12}$, $S_{13}$ and $S_{14}$ will then be repeated. If the "clear" key is not depressed thereafter, the program returns to the node $S_{11}$ and waits for the reactutation of the "enter" key 60'.

The playing time tabulation program may be closed when the playing times of all the tunes recorded on the CD-RW have been tabulated. Then, withdrawing the CD-RW from the FIG. 8 recorder, an unused CD-R may be loaded therein. Now this recorder 1a is in the same state as the FIGS. 1 and 2 recorder 1 just before re-recording from phonograph record onto CD-R. Therefore, in this alternative embodiment too, the playing of the record on the record player 3 may be started, and at the same time the "record" button 48' may be depressed, with concurrent depression of the "enter" key 60'. The recorder 1a will start recording the incoming audio signal on the CD-R 11, automatically assigning track numbers to the successive tunes and writing the track numbers on the subcode regions 65 of the disk as the addresses of the tunes according to the sequential recording program of FIG. 7.

The FIGS. 8 and 9 CD-R recorder 1a is of particular utility when the playing times of the tunes to be re-recorded are now known previously. The CD-RW is made apt use of for pre-recording the tunes and determining their playing times. The CD-RW need not be wholly played at normal speed for detection of the pauses between the pre-recorded tunes but may mostly be fast-forwarded at other than the pauses in order to economize time.

Third Form

Figure 11:
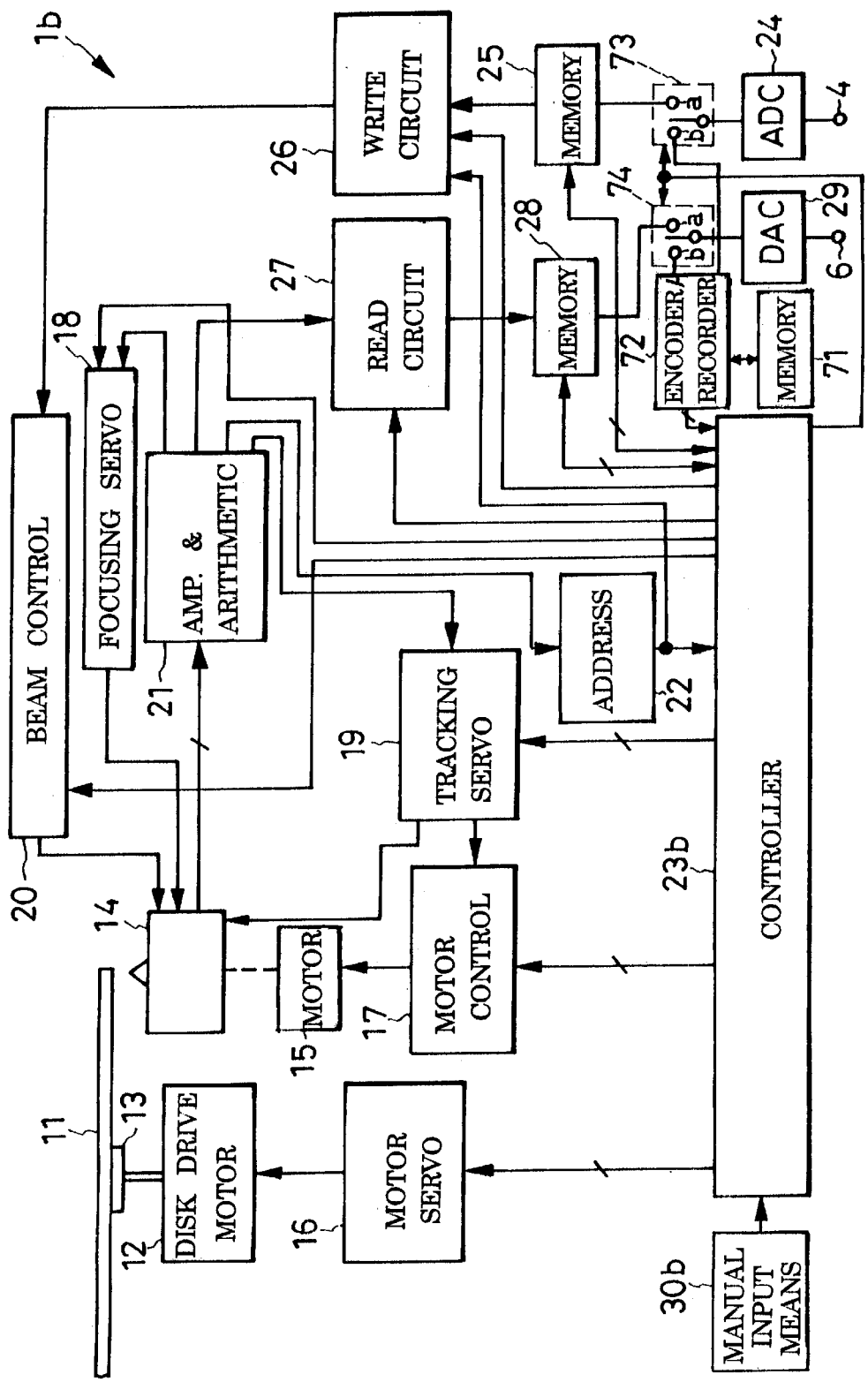
FIG. 11 is a diagram similar to FIG. 2 but showing another alternative form of CD-R/RW record/playback device embodying the present invention.
Figure 12:
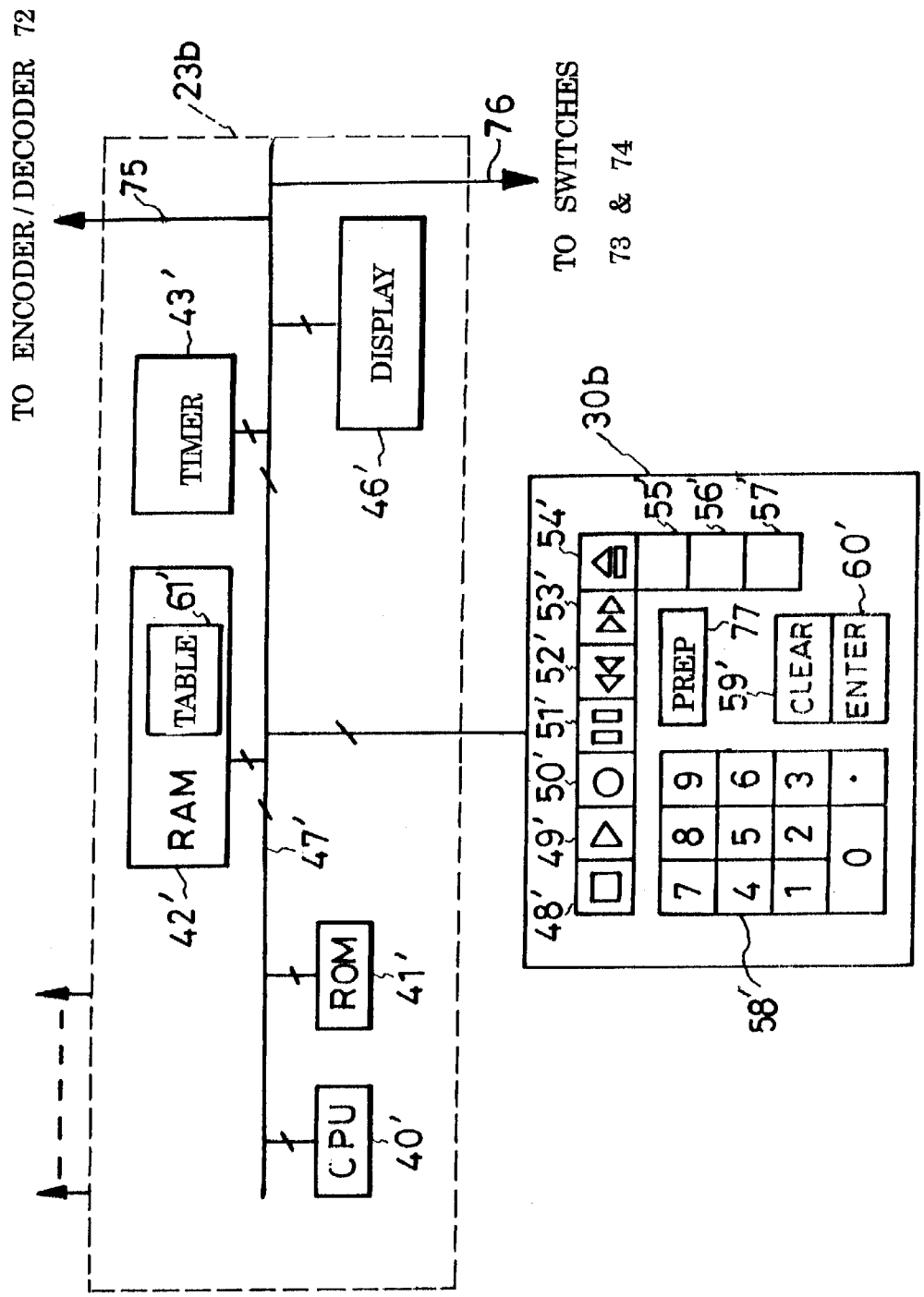
FIG. 12 is a block diagram showing the system controller and manual input means of the FIG. 11 device in more detail.

The third preferred form of CD-R recorder 1b shown in FIGS. 11 and 12 is similar to the FIG. 8 recorder 1a in not relying on the user knowledge of playing times, but differs therefrom in employing a semiconductor memory, in place of a CD-RW, for pre-recording of the tunes to be recorded on a CD-R.

As indicated in FIG. 11, the CD-R recorder 1b comprises a flash memory 71, an encoder/decoder 72, and two selector switches 73 and 74, all for pre-recording, in addition to all the components possessed by the FIG. 8 recorder 1a. The system controller, designated 23b in FIG. 11, is modified to control the prerecording and retrieval of music on and from the flash memory 71. The first selector switch 73 has a movable contact connected to the ADC 24, a first fixed contact a connected to the memory 25, and a second fixed contact b connected to the encoder/decoder 72. The second selector switch 74 has a movable contact connected to the DAC 29, a first fixed contact connected to the memory 28, and a second fixed contact connected to the encoder/decoder 72. The encoder/decoder 72 is additionally connected to the flash memory 71 and the system controller 23b.

In practice the encoder/decoder 72 may take the form of what is known as the MP3 encoder/decoder, capable of Mpeg1 Layer 3 compression encoding and decoding. The digital audio data to be recorded is stored compressed on the memory 71 and re-expanded to its original form following retrieval therefrom. The MP3 encoder/decoder 72 is further equipped to derive time information from the MP3 audio data file stored on the memory 71, for delivery to the controller 23b, and, receiving time information from the controller, to move the readout pointer along the predefined time axis for reading out the required part of the stored data. Each fixed-length frame is compressed according to MP3 encoding, so that calculation of time is relatively easy. Even in cases where the frames are of variable length, the indication and reading of time information are possible if time or similar data size information is written at the frame headers.

Reference may be had to FIG. 12 for a more detailed consideration of the FIG. 11 controller 23b and manual input means 30b. The controller 23b is analogous with its FIG. 9 counterpart 23a in terms of hardware, so that its major components are indicated in FIG. 12 by the same primed reference numerals used to denote the corresponding parts of the FIG. 9 controller 23a. Functionally, however, the controller 23b controls the pre-recording of music on the flash memory 71, rather than on a CD-WR, and the determination of the playing time of each tune read out therefrom, both via the encoder/decoder 72. For these purposes the controller 23b has a bus 75 for connection to the encoder/decoder 72 and a line 76 for controlling the selector switches 73 and 74.

A comparison of FIGS. 9 and 12 will reveal that the manual input means 30a and 30b are alike except that the latter has a "prep" button 77. This "prep" button controls the writing, reading, fast-forwarding, and reversing of the flash memory 71 in pre-recording music thereon and playing it back for determination of the playing time of each tune.

Operation of Third Form

With a phonograph record player or the like connected to the analog input 4 of the CD-R recorder 1b as in FIG. 1, the user may actuate both "prep" button 77 and "record" button 48' of the manual input means 30b, thereby informing the controller 23b of a pre-recording of music. The controller 23b will respond by actuating the switches 73 and 74 to connect the ADC 24 and DAC 29 to the flash memory 71 via the encoder/decoder 72. Then, as the user sets the record player 3 or the like into operation, the tunes thereby played will be successively digitized by the ADC 24, encoded by the encoder/decoder 72, and written on the flash memory 71.

The user may proceed to play back the pre-recorded music, by depression of the "play" button 49', upon completion of the pre-recording. The pre-recorded music will be audibly reproduced by the headphone or loudspeaker system connected to the analog output 6 of the CD-R recorder 1b. It is understood that the controller 23b contains a playing time tabulation program that is essentially identical with that flowcharted in FIG. 10. Each time the user depresses the "enter" key 60' after the end of a tune, the CPU will compute the playing time of the tune from the time information supplied from the encoder/decoder 72 and store the computed playing time on the RAM table 61'. The playback of all the pre-recorded tunes at normal speed is not necessary as aforesaid, but fast-forwarding may be used where possible to expedite the process of pause detection. The "prep" button 77 may be actuated again following the playback and pause detection of all the pre-recorded music. The switches 73 and 73 will then both re-engage the fixed contacts a.

Next comes the step of re-recoding the music from the phonograph record or the like to the CD-R 11 together with addresses assigned to the respective tunes. The user may load an unused CD-R on the turntable 13, set the record player or the like into operation, and actuate both "enter" key 60' and "record" button 48'. The music will be re-recorded on the CD-R 11 together with track or tune numbers assigned to the respective tunes according to the address assignment program of FIG. 7.

Fourth Form

As has been mentioned, the standard CD or CD-R has ninety-nine tracks, so that a maximum of as many tunes are recordable with different track numbers assigned thereto as addresses. Ninety-nine different addresses suffice all practical purposes, particularly if the matter to be recorded is musical tunes. In the case of sound effects, rather than music, however, there are phonograph records or magnetic tapes containing more than ninety-nine streams or items of such sound. In digitally re-recording such numerous pieces of sound-effects on a CD-R, the resulting CD will be far more convenient of use if all the sound-effects items are individually addressed and so individually accessible. Here is therefore disclosed a CD-R recording system capable of individually assigning addresses to more than ninety-nine items of sound effects or other information as they are all recorded on one CD-R.

Figure 13:
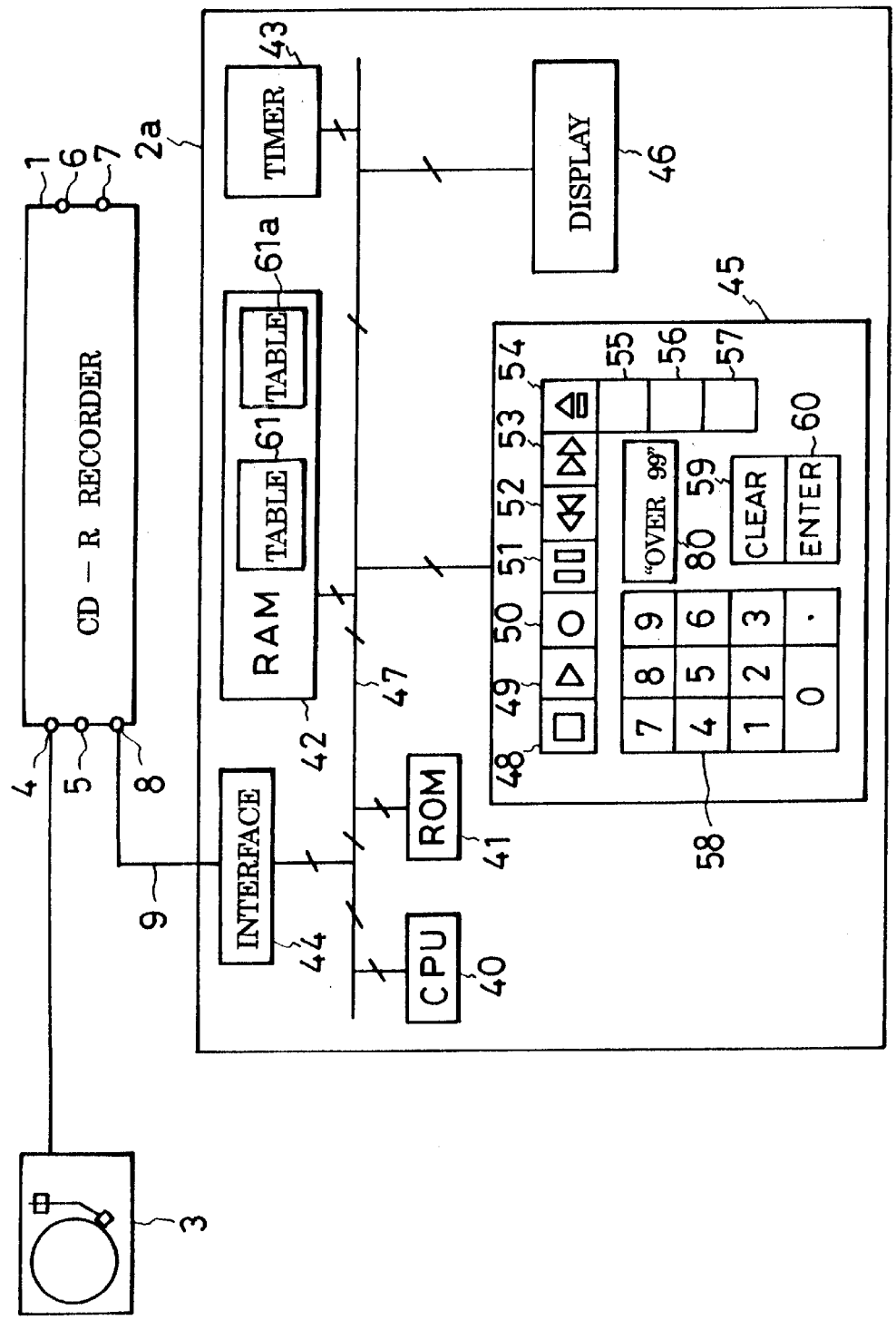
FIG. 13 is a diagram similar to FIG. 1 but showing still another alternative embodiment of the invention.

As shown in FIG. 13, the CD-R recorder 1 is combined with a remote control 2a that is similar to its FIG. 1 counterpart 2 except for the addition of a second RAM table 61a and an "over 99" button 80. The first RAM table 61 of this remote control 2a is for storing the playing times of up to ninety-nine tunes, sound-effects items, or other information streams as in FIG. 4. As indicated by way of example in FIG. 14, the second RAM table 61a is for use in "over 99" mode in which more than ninety-nine sound-effects items or other information streams are to be recorded on one CD-R. There are utilized in "over 99" mode not only the track numbers but also the index numbers, which are both recorded on the subcode region 65 of each frame of the CD-R as in FIG. 6, in prescribed combinations as addresses of the more than ninety-nine information streams recorded. The "over 99" button 80 is to be depressed for setting up the "over 99" mode.

Referring more specifically to the second RAM table 61a of FIG. 14, the first stream recorded is given the address of Track No. 1 plus Index No. 1. The digit "1" is therefore recorded at both track number region 65a, FIG. 6, and index number region 65b of the pertinent frames. The second stream recorded is given the address of Track No. 1 plus Index No. 2. The digit "1" is recorded at the track number region 65a, and the digit "2" at the index number region 65b, of the pertinent frames. The ninety-ninth stream recorded is given the address of Track No. 1 plus Index No. 99. The digit "1" is recorded at the track number region 65a, and the digits "99" at the index number region 65b, of the pertinent frames. The hundredth stream recorded, not addressable by use of track numbers only, is given the address of Track No. 2 plus Index No. 1. The digit "2" is recorded at the track number region 65a, and the digit "1" at the index number region 65b, of the pertinent frames. The one-hundred-and-first stream recorded is given the address of Track No. 2 plus Index No. 2. The digit "2" is recorded at both track number region 65a and index number region 65b of the pertinent claims.

Thus, for addressing each of the hundred or more information streams recorded, index numbers are incremented for each item, and track numbers are incremented for every one hundredth item.

Operation of Fourth Form

For digital re-recording of more than ninety-nine information streams on a CD-R by the FIG. 13 recording system, the user may first ascertain the recording times of all such streams and write the playing times, or cause them to be written, on the second RAM table 61a by any of the methods set forth previously. It is understood that this table 61a is also filled with the addresses, track numbers plus index numbers, of the information streams to be recorded.

Then the user may actuate the "over 99" button 80 of the remote control 2a thereby triggering the CD-R recorder 1 into "over 99" recording mode. Then the user may start playing the phonograph record or the like on the record player 3 or the like and recording the audio signal on the CD-R recorder 1. As the successive pieces of sound effects or like information streams are recorded on the CD-R 11, there will also be recorded on the subcode region 65 of each frame a combination of a track number and an index number that is assigned to each stream being recorded. The addresses stored on the second RAM table 61a will be incremented just as the addresses stored on the first RAM table 61 are in normal mode; that is, each time the time being measured by the timer 43 agrees with one of the expected recording times stored on the second RAM table.

The CD-R recorder of FIG. 13 is capable of recording not only more than ninety-nine streams but smaller numbers of streams, too, by using the first RAM table 61 and by the methods explained in conjunction with the FIG. 1 CD-R recorder 1. In the second and third disclosed embodiments of the invention, too, the RAM 41' may be modified to incorporate the second table 61a in order to permit recording of either more than, or not more than, ninety-nine information streams together with an address for each.

Possible Modifications

Despite the foregoing detailed disclosure it is not desired that the present invention be limited by the exact showing of the drawings or the description thereof. The following is a brief list of possible modifications or alterations of the illustrated embodiments which are all believed to fall within the purview of this invention:

1. The user may cause the addresses to be incremented at any moment from the end of one information stream to the beginning of the next. No difficulties will be encountered in practice, moreover, if the addresses are incremented shortly before the end, or shortly after the beginning, of each information stream.

2. The second and the third disclosed embodiments of the invention may be modified to include a pause detector, such that pauses between the tunes being played back preliminary to re-recording will be detected automatically in order to register the playing time of each tune. Since errors in automatic pause detection are almost unavoidable, it is recommended that the user be enabled to correct the errors as by actuation of the "clear" key 60.

3. Such a pause detector may alternatively be used for pause detection of the tunes being pre-recorded in the same embodiments, and the playing times thus ascertained may be immediately stored on the RAM table 61. The user may make sure in the course of the subsequent playback of the pre-recorded tunes if the pauses have been correctly detected, making corrections where necessary.

4. In consideration of cases where both sides of a phonograph record or a magnetic tape are to be played in succession for re-recording on a CD-R, the user may introduce a pause at a desired location on the RAM table 61 or 61'. Such a pause may be input manually in the first disclosed embodiment and, in the second and the third, by concurrent depression of the "pause" and "stop" buttons during preliminary recording. The position in time of the input pause may be made correctable later.

5. The controllers 23a and 23b of the second and the third disclosed embodiment may be furnished with a serial port or the like for connection of a personal computer system or the like thereby remotely to control the CD-R recorder and, particularly, to enter corrections into the RAM table 61'.

6. The remote control 2 may be used to send an address increment command to the CD-R recorder if the latter is equipped to generate addresses.

7. After the pre-recording of an analog audio signal on a CD-RW, and the writing of the time information on the RAM table 61', in the second disclosed embodiment, the recorded digital audio signal with the addresses may be read out at high speed for delivery to another CD-RW recorder, a process known as "high speed dubbing."

What is claimed is:

1. A recording apparatus capable of recording a series of information streams, supplied from an external source without self-identificatory data, on a record medium together with addresses assigned one to each information stream according to a storage location thereof on the record medium, comprising:

(a) a memory for storing a series of incremental addresses to be assigned to successive information streams as the latter are supplied from an external source, and expected lengths in time of the information streams;

(b) a timer for measuring an actual length in time of each information stream being recorded on the record medium; and (c) a processor connected to both the memory and the timer for comparing the expected and the actual length in time of each information stream that has been recorded, and, upon agreement of the expected and the actual length in time of each information stream, for incrementing the addresses stored on the memory thereby causing each information stream to be recorded on the record medium together with an address assigned thereto.

2. The recording apparatus of claim 1 further comprising manual input means for manually inputting into the memory the expected lengths in time of the information streams to be recorded.

3. The recording apparatus of claim 1 further comprising means for ascertaining the expected playing times of the information streams to be recorded.

4. The recording apparatus of claim 3 wherein the ascertaining means comprises:

(a) a storage medium on which are to be pre-recorded the series of information streams to be recorded on the record medium, together with cumulative time from the beginning of the pre-recording; and (b) means for computing the expected playing times of the information streams on the basis of the cumulative time read from the storage medium at the end of retrieval of each information stream therefrom.

5. The recording apparatus of claim 4 wherein the storage medium is an optical disk.

6. The recording apparatus of claim 4 wherein the storage medium is a semiconductor memory.

7. The recording apparatus of claim 1 wherein the record medium is an optical disk having a series of frames each having a data region for storing user data, and a subcode region for storing subcode, the subcode including track numbers indicative of the storage locations of the user data on the disk, and wherein the track numbers are stored on the memory as the addresses to be assigned to the information streams as the latter are stored on the data regions of the optical disk.

8. The recording apparatus of claim 1 wherein the record medium is an optical disk having a series of frames each having a data region for storing user data, and a subcode region for storing subcode, the subcode including track numbers and, as subdivisions of each track number, index numbers indicative of the storage locations of the user data on the disk, and wherein the track numbers and the index numbers are stored in combinations on the memory as the addresses to be assigned to the information streams as the latter are stored on the data regions of the optical disk.

9. A method of recording a series of information streams, supplied from an external source thereof without self-identificatory data, on a record medium together with addresses assigned one to each information stream according to a storage location thereof on the record medium, which method comprises:

(a) ascertaining the lengths in time of information streams to be recorded;

(b) storing on a memory a series of incremental addresses to be assigned to the successive information streams as they are supplied in a prescribed sequence, and, as expected recording times of the information streams, the lengths in time of the information streams ascertained at step (a);

(c) recording the successive information streams on a record medium in the prescribed sequence;

(d) measuring the actual recording time of each information stream being recorded;

(e) comparing the expected and the actual recording time of each information stream that has been recorded; and (f) upon agreement of the expected and the actual recording time of each information stream recorded, incrementing the addresses stored on the memory for causing each information stream to be recorded on the record medium with an address assigned thereto.

10. The recording method of claim 9 wherein the lengths in time of the information streams to be recorded are ascertained by:

(a) pre-recording the information streams on a storage medium in a prescribed sequence, together with cumulative time from the beginning of the pre-recording;

(b) reading the pre-recorded information streams and the cumulative time on the storage medium; and (c) computing the lengths in time of the information streams on the basis of the cumulative time read from the storage medium at the end of reading of each information stream.

11. The recording method of claim 9 wherein the record medium is an optical disk having a series of frames each having a data region for storing user data, and a subcode region for storing subcode, the subcode including track numbers indicative of the storage locations of the user data on the disk, and wherein the track numbers are stored on the memory as the addresses to be assigned to the information streams as the latter are stored on the data regions of the optical disk.

12. The recording method of claim 9 wherein the record medium is an optical disk having a series of frames each having a data region for storing user data, and a subcode region for storing subcode, the subcode including track numbers and, as subdivisions of each track number, index numbers indicative of the storage locations of the user data on the disk, and wherein the track numbers and the index numbers are stored in combinations on the memory as the addresses to be assigned to the information streams as the latter are stored on the data regions of the optical disk.

* * * * *